United States Patent [19]
Morita

[11] Patent Number: 6,023,412
[45] Date of Patent: Feb. 8, 2000

[54] SYSTEM BOARD DEVICE HAVING A DISPLACEABLE DAUGHTER-BOARD COVER

[75] Inventor: Yoshihiro Morita, Kawasaki, Japan

[73] Assignee: Fujitsu Limited, Kawasaki, Japan

[21] Appl. No.: 09/263,840

[22] Filed: Mar. 8, 1999

[30] Foreign Application Priority Data

Jul. 24, 1998 [JP] Japan .................... 10-209733

[51] Int. Cl.⁷ .................... H05K 7/20
[52] U.S. Cl. .................... 361/690; 361/688; 361/694; 361/695; 361/704; 361/720; 361/721; 174/16.1; 165/80.3
[58] Field of Search .................... 361/687–695, 361/697, 704, 719–721; 174/16.1, 15.1, 16.3; 165/80.3, 104.33, 185; 312/223.2

[56] References Cited

U.S. PATENT DOCUMENTS

| | | | |
|---|---|---|---|
| 5,243,493 | 9/1993 | Jeng et al. | 361/690 |
| 5,477,416 | 12/1995 | Schkrohowsky et al. | 361/695 |
| 5,734,551 | 3/1998 | Hileman et al. | 361/695 |
| 5,910,884 | 6/1999 | Garza et al. | 361/690 |
| 5,940,266 | 8/1999 | Hamilton et al. | 361/695 |

FOREIGN PATENT DOCUMENTS

| | | |
|---|---|---|
| 53-101669 | 9/1978 | Japan . |
| 59-145595 | 8/1984 | Japan . |
| 59-181523 | 12/1984 | Japan . |
| 1-89791 | 6/1989 | Japan . |
| 1-190058 | 7/1989 | Japan . |
| 3-12471 | 2/1991 | Japan . |
| 5-53979 | 7/1993 | Japan . |
| 5-259661 | 10/1993 | Japan . |
| 6-196839 | 7/1994 | Japan . |
| 7-111378 | 4/1995 | Japan . |
| 8-276638 | 10/1996 | Japan . |
| 9-36574 | 2/1997 | Japan . |

*Primary Examiner*—Leo P. Picard
*Assistant Examiner*—Boris L. Chervinsky
*Attorney, Agent, or Firm*—Armstrong, Westerman, Hattori, McLeland & Naughton

[57] ABSTRACT

A daughter-board cover of a system board device which daughter-board cover covers daughter boards can be removed by a simple operation in a short time. The system board device is adapted to be subjected to forced-air cooling. At least one electronic part generating heat is mounted on a motherboard. A plurality of daughter boards are removably mounted on the motherboard. The daughter boards are mounted so as to be perpendicular to the motherboard. A ventilation cover is attached to the motherboard so as to form an air passage therebetween so that the electronic part and the daughter boards are accommodated in the air passage. The ventilation cover includes the daughter-board cover covering the daughter boards. The daughter-board cover is displaceable so that each of the daughter boards are accessible.

6 Claims, 8 Drawing Sheets

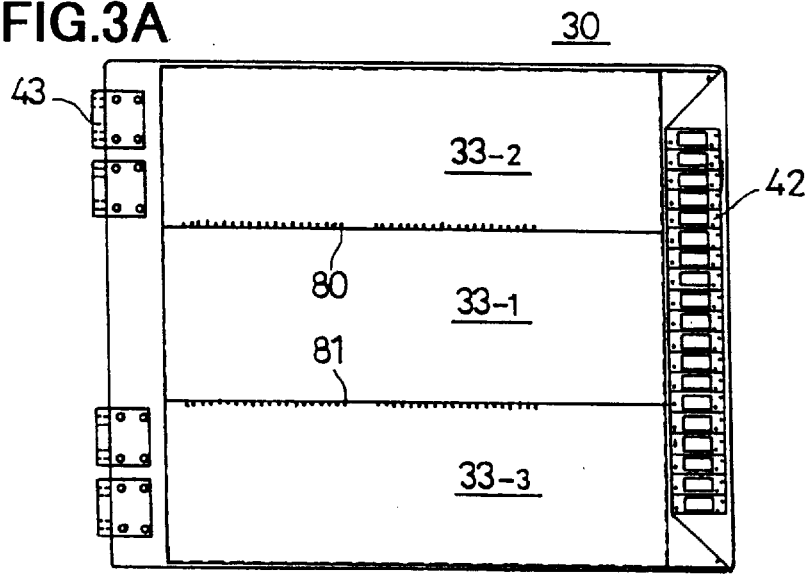
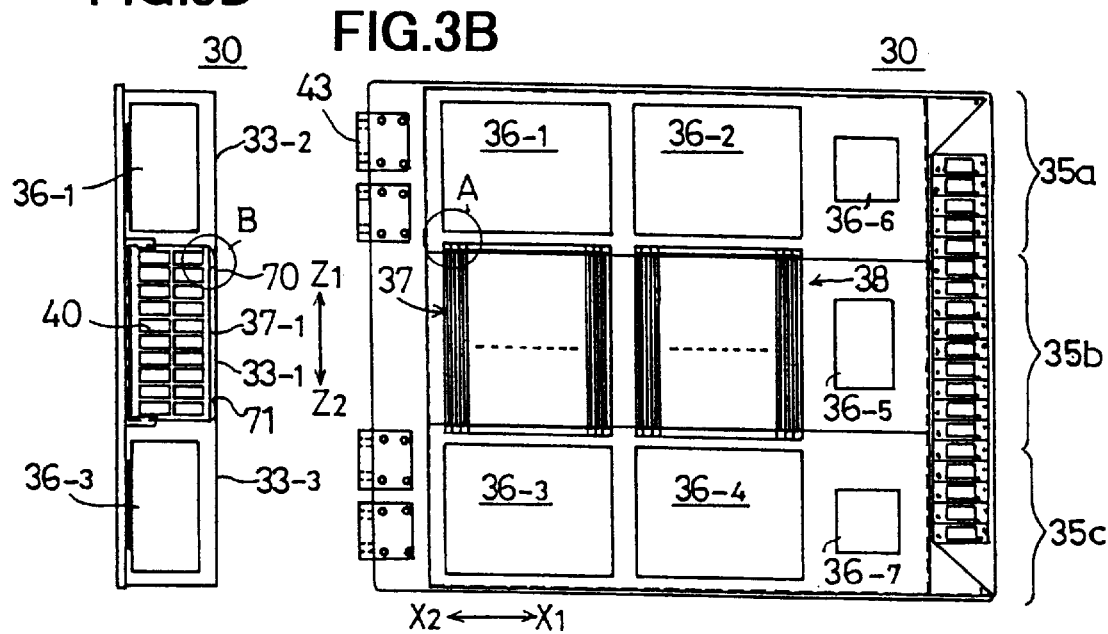
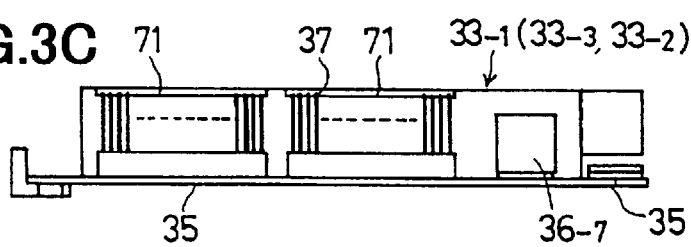

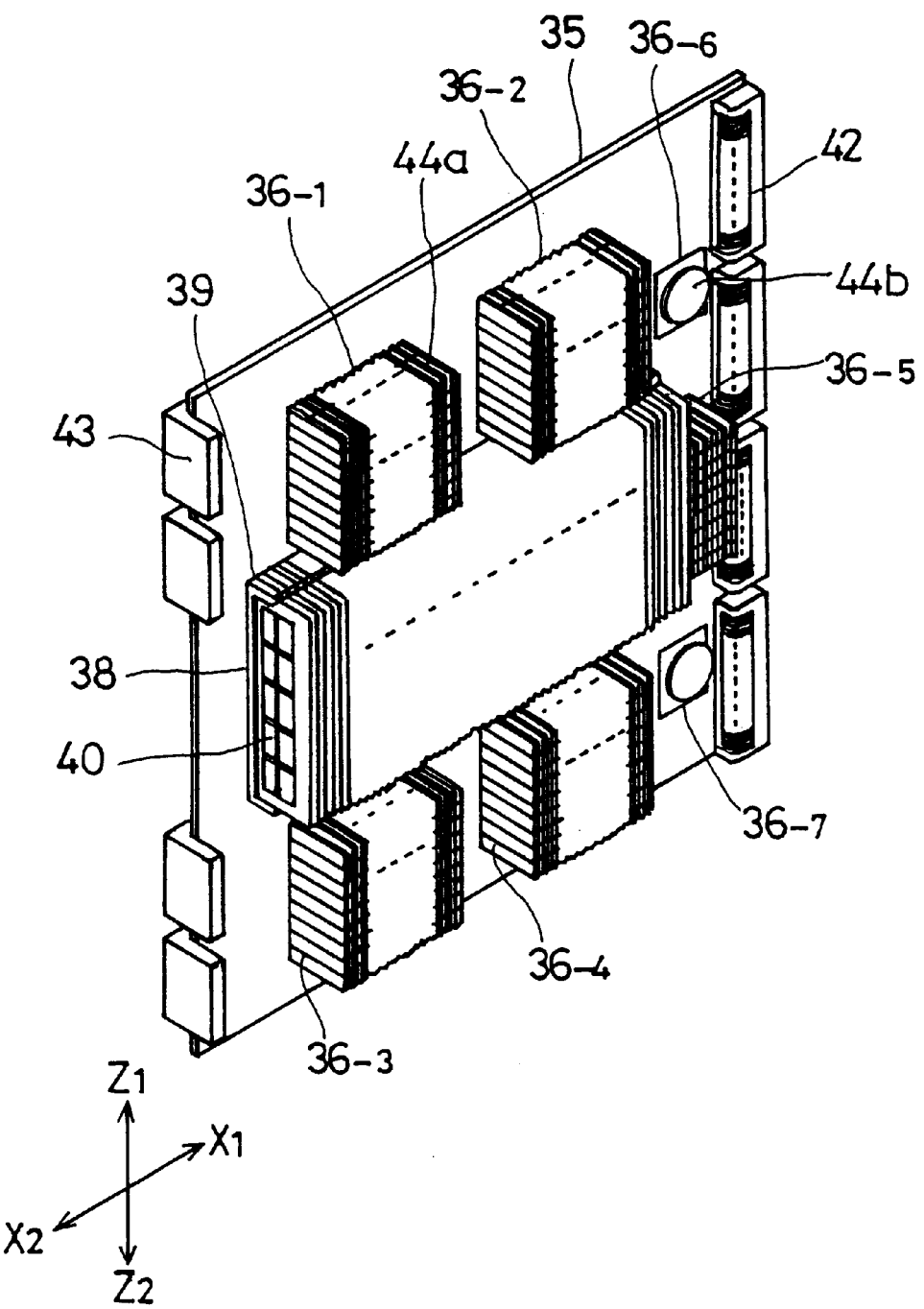

FIG.8B
FIG.8A
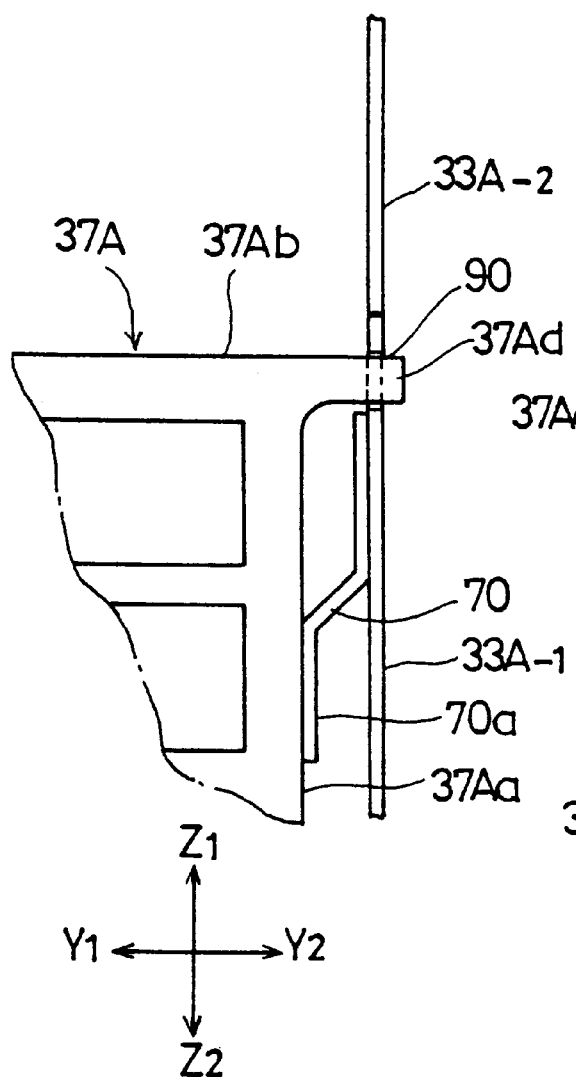
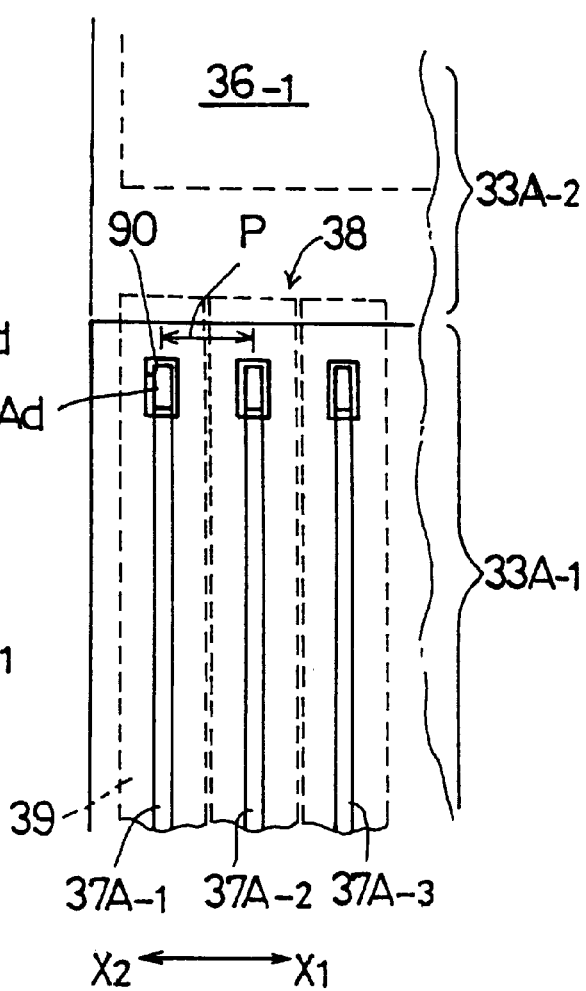

SYSTEM BOARD DEVICE HAVING A DISPLACEABLE DAUGHTER-BOARD COVER

BACKGROUND OF THE INVENTION

1. Field of the Invention

The present invention generally relates to a system board device and, more particularly, to a system board device which is provided in a large-scale computer and is subjected to a forced air cooling.

A large-scale computer is provided with a system board device. Such a system board device includes a plurality of daughter boards mounted on a motherboard. Each of the daughter boards has a plurality of random-access memories (RAMs) mounted thereon. If a malfunction occurs in one of the RAMs mounted on one of the daughter boards, it is required to replace the one of the daughter boards which one has the malfunctioning RAM with a new daughter board. Generally, a number of RAMs provided in a single system board is as large as a few hundred to a few thousand. Accordingly, a malfunction frequently occurs in the RAMs as a whole, and a maintenance operation is frequently required for the system board device. Thus, it is preferable that the system board device be of an easy maintenance construction.

2. Description of the Related Art

FIG. 1 is an exploded perspective view of a conventional system board device 10. The system board device 10 is built in a large-scale computer 11. A ventilation cover 13 of the system board device 10 is fixed to a motherboard unit 12 by a plurality of screws 14. The motherboard unit 12 includes a motherboard 15 on which a plurality of electronic parts 16 are mounted. A plurality of daughter boards 18 are also mounted on the motherboard 15 with connectors therebetween so as to be perpendicular to the motherboard 15. A plurality of RAMs 17 are mounted on each of the daughter boards 18. The ventilation cover 13 is provided for forming a tunnel-like passage 19 so that air may flow therethrough. The ventilation cover 13 covers all of the electronic parts 16 and all of the daughter boards 18 so that the tunnel-like passage 19 accommodates all of the electronic parts 16 and all of the daughter boards 18.

When the large-scale computer 11 is in operation, a cooling fan 20 is operated so as to blow air upwardly. Thereby, external air is introduced into the large-scale computer 11 through the bottom side of the large-scale computer 11, and an upward air flow 21 is generated in the large-scale computer 11. The air flow 21 goes through the tunnel-like passage 19 so that heat generated by the electronic parts 16 and the RAMs 17 is removed therefrom by the air flow 21.

When a maintenance operation is performed so as to replace one of the daughter boards 18 which is malfunctioning with a new one, the ventilation cover 13 must be removed so that the daughter boards 18 are accessible.

In the conventional system board device 10, the ventilation cover 13 has a size almost the same as the size of the motherboard 15, and is secured to the motherboard 15 by the screws 14 at many positions. For example, the ventilation cover 13 is secured by five screws 14 on each side, and a total of ten screws are used to secure the ventilation cover 13 to the motherboard 15. Accordingly, in order to remove the ventilation cover 13, an unscrewing operation is performed for ten screws, which unscrewing operation takes a long time.

As mentioned above, there is a problem in that it takes a long time for the conventional system board device 10 to be prepared for a replacing operation of one of the daughter boards 18 which one is malfunctioning.

SUMMARY OF THE INVENTION

It is a general object of the present invention to provide an improved and useful system board device in which the above-mentioned problem is eliminated.

A more specific object of the present invention is to provide a system board device having a cover covering daughter boards which cover can be removed by a simple operation in a short time.

In order to achieve the above-mentioned objects, there is provided according to one aspect of the present invention a system board device adapted to be subjected to forced-air cooling, the system board device comprising:

a motherboard on which at least one electronic part generating heat is mounted;

a plurality of daughter boards removably mounted on the motherboard, the daughter boards being mounted so as to be perpendicular to the motherboard; and a ventilation cover attached to the motherboard so as to form an air passage therebetween so that the electronic part and the daughter boards are accommodated in the air passage, the ventilation cover including a daughter-board cover covering the daughter boards, the daughter-board cover being displaceable so that each of the daughter boards are accessible.

According to the above-mentioned invention, since the ventilation cover includes the daughter-board cover which can be independently displaceable relative to other portions of the ventilation cover, there is no need to remove the entire ventilation cover when one of the daughter boards, which one is malfunctioning, is to be replaced with new one. Thus, time and labor required for a maintenance operation to replace one of the daughter boards which one is malfunctioning can be decreased. This is especially effective in a case in which each of the daughter boards has many RAMs and the maintenance work is frequently required.

In the system board device according to the present invention, the daughter-board cover may include an elastic member which elastically presses each of the daughter boards toward the motherboard in a state in which the daughter-board cover is attached to said motherboard so as to cover the daughter boards.

Accordingly, the mechanical connection between each of the daughter boards and a connector of the motherboard is positively prevented from being loosened since each of the daughter boards is elastically pressed by the elastic member in a direction in which each of the daughter boards is connected to the connector of the motherboard. Thus, even if the system board device is subjected to a shock or vibration during transportation or subjected to vibration caused by a cooling fan during operation, the daughter board is positively prevented from being loosened. This feature is especially effective when a weight of each of the daughter boards is increased due to an increase in the number of RAMs mounted thereon.

Additionally, in the system board device according to the present invention, each of the daughter boards may have at lease one protrusion protruding toward the daughter-board cover in a state in which the daughter-board cover is attached to the motherboard so as to cover the daughter boards, and the daughter-board cover may include engaging portions each of which is engaged with the protrusion of a corresponding one of the daughter boards in the state in which the daughter-board cover is attached to the motherboard so as to cover the daughter boards.

Accordingly, since each of the daughter boards is engaged with the daughter-board cover when the daughter-board is attached to the motherboard, each of the daughter boards is positively prevented from being inclined if the system board device is subjected to a shock or vibration. This feature is especially effective when a height of each of the daughter boards is increased due to an increase in the number of RAMs mounted thereon.

In one embodiment of the present invention, the engaging portions may be openings formed in the daughter-board cover so that the protrusion of each of the daughter boards protrudes into a corresponding one of the openings.

Additionally, in the system board device according to the present invention, the ventilation cover may include a parts cover adjacent to the daughter-board cover, the parts cover having a flange portion extending toward the motherboard, the flange portion being formed on a side of the parts cover which side faces the daughter-board cover, the flange portion including notches so that each of the notches engages with a side of one of the daughter boards when the one of the daughter boards is being moved toward the motherboard for connection, each of the notches engaging with the one of the daughter boards in a state in which the one of the daughter boards is mounted on the motherboard.

According to this invention, each of the daughter boards can be properly directed to a socket of the motherboard, which socket is provided for mounting each of the daughter boards on the motherboard, by being guided by the notches engaged with the sides of the daughter boards being mounted to the motherboard. Thus, a smooth insertion of each of the daughter boards into the socket can be achieved. Additionally, since each of the daughter boards is engaged with the corresponding notch in a state in which the daughter board is mounted on the motherboard, each of the daughter boards is positively prevented from being inclined if the system board device is subjected to shock or vibration.

Additionally, there is provided according to another aspect of the present invention an apparatus comprising:
a cooling fan generating an air flow; and
a system board device adapted to be subjected to forced-air cooling by the air flow generated by the cooling fan, the system board device comprising:
a motherboard on which at least one electronic part generating heat is mounted;
a plurality of daughter boards removably mounted on the motherboard, the daughter boards being mounted so as to be perpendicular to the motherboard; and
a ventilation cover attached to the motherboard so as to form an air passage therebetween so that the electronic part and the daughter boards are accommodated in the air passage, the ventilation cover including a daughter-board cover covering the daughter boards, the daughter-board cover being displaceable so that each of the daughter boards are accessible.

Other objects, features and advantages of the present invention will become more apparent from the following detailed description when read in conjunction with the accompanying drawings.

BRIEF DESCRIPTION THE DRAWINGS

FIG. 3A is a front view of the system board device shown in FIG. 2;

FIG. 3B is a front view of the system board device shown in FIG. 2 in a state in which a ventilation cover is removed;

FIG. 3C is a bottom view of the system board device shown in FIG. 3B;

FIG. 3D is a side view of the system board device 30 shown in FIG. 3B;

FIG. 4 is a perspective view of a motherboard unit shown in FIG. 2;

FIGS. 8A is an enlarged view of a part of the system board device shown FIG. 7; FIG. 8B is an enlarged view of a part of the system board device shown in FIG. 7.

DETAILED DESCRIPTION OF THE PREFERRED EMBODIMENTS

Figure 1:
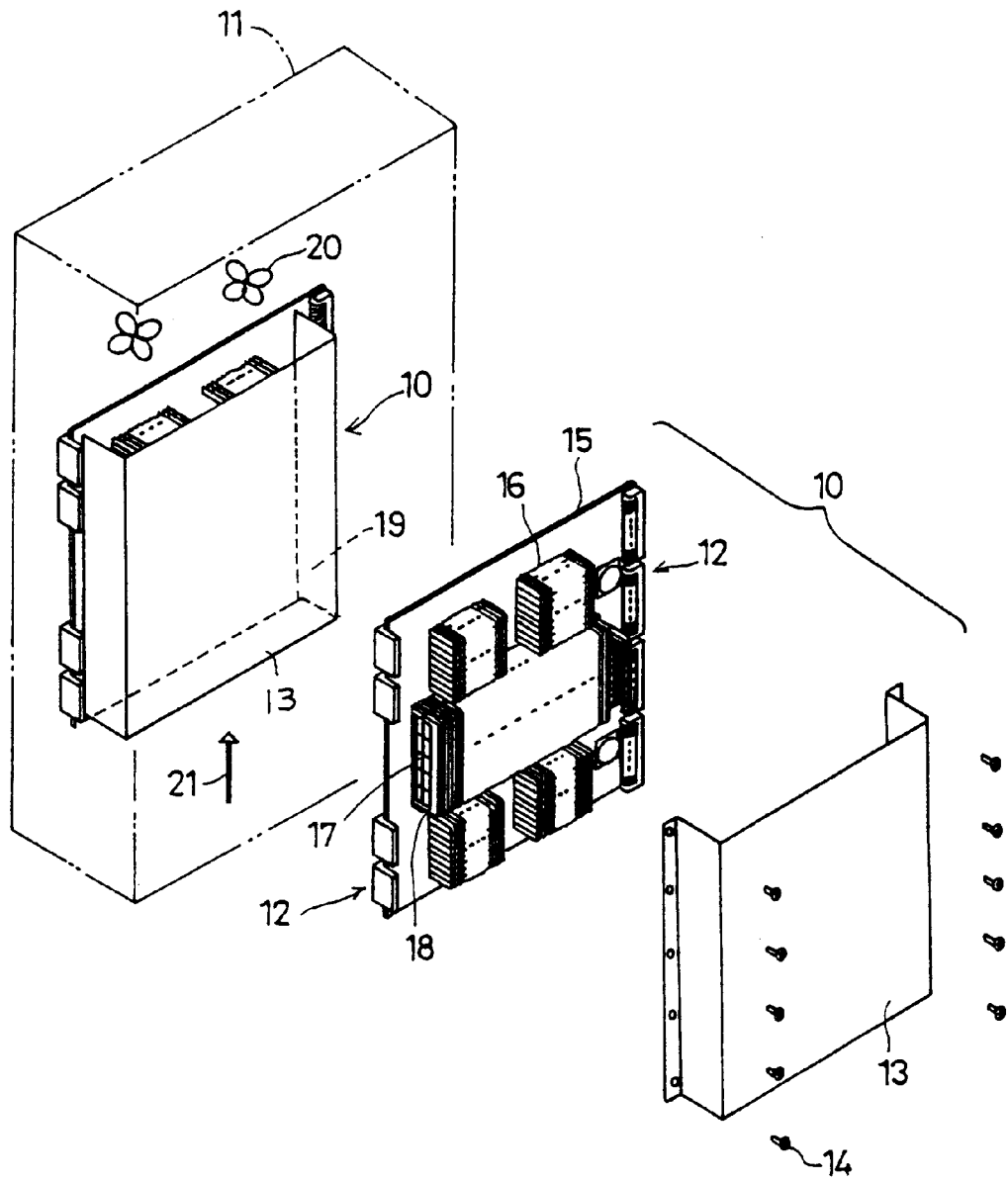
FIG. 1 is an exploded perspective view of a conventional system board device.
Figure 2:
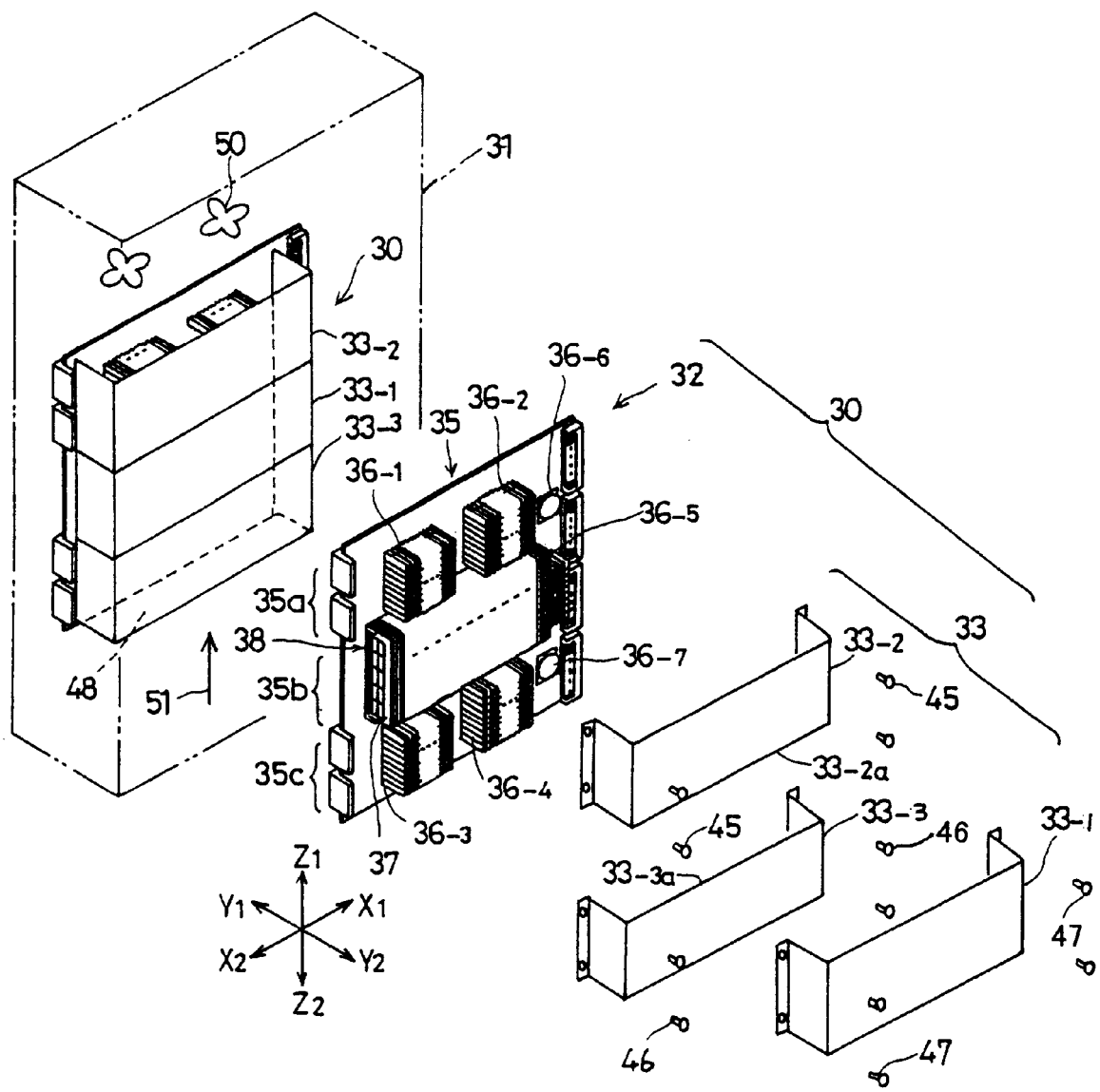
FIG. 2 is an exploded perspective view of a system board device according to a first embodiment of the present invention.

A description will now be give, with reference to FIG. 2 and FIGS. 3A, 3B, 3C and 3D, of a first embodiment of the present invention. FIG. 2 is an exploded perspective view of a system board device 30 according to the first embodiment of the present invention. FIG. 3A is a front view of the system board device 30 shown in FIG. 2; FIG. 3B is a front view of the system board device 30 shown in FIG. 2 in a state in which a ventilation cover is removed; FIG. 3C is a bottom view of the system board device 30 shown in FIG. 3B; FIG. 3D is a side view of the system board device 30 shown in FIG. 3B.

As shown in FIG. 2, the system board device 30 is provided in a large-scale computer 31. In FIGS. 2 and 3A to 3D, a direction indicated by an arrow Z1 or Z2 is a vertical direction which corresponds to a direction of a height of the computer 31 in which the system board device 30 is provided, and a direction indicated by an arrow X1 or X2 is a transverse direction which corresponds to a direction of a width of the computer 31.

FIG. 4 is a perspective view of a motherboard unit 32 included in the system board device 30. The motherboard unit 32 comprises a motherboard 35 and many electronic parts 36-1 to 36-7 such as CPU modules and a plurality of daughter boards 37-1 to 37-n which are mounted on the motherboard 35. Hereinafter, the daughter boards 37-1 to 37-n are represented as a daughter board 37 as a whole. A card-edge-type socket assembly 38 and the electronic part 36-5 are mounted on a middle portion 35b of the motherboard 35 in the direction Z1 or Z2. The electronic parts 36-1, 36-2 and 36-6 are mounted on an upper part 35a of the motherboard 35, and the electronic parts 36-3, 36-4 and 36-7 are mounted on a lower part 35c of the motherboard 35. Each of the electronic parts 36-1 to 36-5 is provided with a large heat sink or heat-release fin 44a. Each of the electronic parts 36-6 and 36-7 is provided with a small heat sink or heat-release fin 44b. The card-edge-type socket assembly 38 includes a plurality of card-edge-type sockets 39 arranged adjacent to each other along a direction X1 or X2 so that a longitudinal direction of each of the card edge type sockets 39 extends in the direction Z1 or Z2. The daughter board 37 includes a plurality of RAMs 40 as shown in FIG. 6. One side of the daughter board 37 is formed as a card edge connector part 41 which is inserted into the one of the card-edge-type sockets 39. Specifically, the daughter boards 37-1 to 37-n are mounted on the motherboard 35 via the respective card edge type sockets 39 so that each of the daughter boards 37-1 to 37-n is mounted so as to be perpendicular to the motherboard 35. The daughter boards 31-1 to 37-n are arranged in the direction X1 or X2 with a uniform pitch P of about 10 mm as shown in FIG. 5A.

Additionally, a plurality of I/O connectors 42 are mounted along one side (X1 side) of the motherboard 35, and a plurality of terminal members 43 are mounted along an opposite side (X2 side) of the motherboard 35.

As shown in FIGS. 2, 3A and 5, the ventilation cover 33 comprises a daughter-board cover 33-1 and electronic parts covers 33-2 and 33-3 arranged along the direction Z1 or Z2. The daughter-board cover 33-1 is secured to the middle part 35b of the motherboard 35 by four screws 47 so as to cover the daughter boards 37-1 to 37-n and the electronic part 36-5. The electronic-parts cover 33-2 is secured to the upper part 35a of the motherboard 35 by four screws 45 so as to cover the electronic parts 36-1, 36-2 and 36-6. The electronic-board cover 33-3 is secured to the lower part 35c of the motherboard 35 by four screws 46 so as to cover the electronic parts 36-3, 36-4 and 36-7.

The daughter board cover 33-1 is secured to the motherboard 35 by the four screws 47 as shown in FIG. 6, and is positioned between the electronic parts-cover 33-2 and the electronic parts cover 33-3. The daughter-board cover 33-1 and the electronic-parts cover 33-2 and 33-3 together form a tunnel-like passage 48 which extends in the direction Z1 or Z2 so that cooling air flows through the tunnel-like passage 48.

According to the ventilation cover 33, the daughter-board cover 33-1 can be removed alone. When the daughter-board cover 33-1 is removed from the motherboard 35, all of the daughter boards 37-1 to 37-n are exposed as shown in FIG. 5. When the computer 31 is in operation, a cooling fan 50 is operated so as to blow air upwardly. Thereby, external air is introduced into the large-scale computer 31 through the bottom side of the large-scale computer 31, and an upward air flow 51 is generated in the large-scale computer 31. The air flow 51 goes through the tunnel-like passage 48 so that heat generated by the electronic parts 36-1 to 36-7 and the RAMs 40 is removed therefrom by the air flow 51.

A description will now be given of a maintenance operation to remove one of the daughter boards 37-1 to 37-n which one is malfunctioning.

When the maintenance operation is performed to replace one of the daughter boards 37-1 to 37-n with a new one, the daughter-board cover 33-1 is removed first, while the electronic-board covers 33-2 and 33-3 are maintained to be secured to the motherboard 35. The removal of the daughter-board cover 33-1 is done by a very easy operation, that is, by unscrewing the four screws 47. After the daughter-board cover 33-1 is removed, an opening window 60 is formed through which opening window all of the daughter boards 37-1 to 37-n are accessible. Accordingly, any one of the daughter boards 37-1 to 37-n can be removed from the motherboard 35 and a new daughter board can be mounted on the motherboard 35 through the opening window 60.

Thus, one of the daughter boards 37-1 to 37-n which one has a malfunctioning RAM is removed from the motherboard 35 by pulling in a direction indicated by an arrow Y2. Then, a new normal daughter board is inserted in a direction indicated by an arrow Y1 so that the daughter board having a malfunctioning RAM is replaced with the new normal daughter board.

Thereafter, it is checked whether or not the operation of the system board device 30 is normal. After a normal operation of the system board device 30 is confirmed, the daughter-board cover 33-1 is placed on the motherboard 35 and the four screws 47 are fastened so as to close the opening window 60. Accordingly, the operation for returning the daughter-board cover 33-1 is easily performed by fastening the four screws 47.

The maintenance operation to replace one of the daughter boards 37-1 to 37-n is completed by the above-mentioned process. Thus, the number of screws to be unfastened and fastened is smaller than that of the conventional system board device 30. Accordingly, a time needed for the maintenance operation is reduced.

It should be noted that although the daughter-board cover 33-1 is completely separated from the system board device 30, the present invention is not limited to such a structure. For example, the daughter-board cover 33-1 may be mounted to a member of the system board device 30 such as the motherboard 35 by a hinge so that the daughter-board cover 33-1 can be rotated like a door.

Additionally, screw holes of the daughter-board cover 33-1 may be formed like a shape of the number "8" so that the daughter-board cover 33-1 can be slightly moved after the four screws 47 are unfastened so that each of the four screws 47 is aligned with a larger part of each of the screw holes. In such a construction, the daughter-board cover 33-1 can be removed from the motherboard 35 without completely unfastening the four screws 47.

A description will now be given of other characteristic features of the system board device 30.

(1) An arrangement for preventing a connection between the daughter board 37 and the card edge type socket 39 from being loosened:

As shown in FIGS. 3D, 5A, 5B and 6, elongated plate spring members 70 and 71 are provided along a side 33-1a which is the direction Z1 side of the daughter-board cover 33-1 and a side 33-1b which is the direction Z2 side of the daughter-board cover 33-1, respectively. Each of the spring plate members 70 and 71 elastically presses a side 37a of each of the daughter boards 37-1 to 37-n in the direction Y1 in a state in which the daughter-board cover 33-1 is attached to the motherboard 35.

Recently, a number of RAMs 40 mounted on each of the daughter boards 37-1 to 37-n has been increased and a height h of each of the daughter boards 37-1 to 37-n has also been increased to as high as 10 cm. Accordingly, if the connection between each of the daughter boards 37-1 to 37-n and the motherboard 35 relies upon only a mechanical force of the card-edge connector, the connection may be loosened due to shock or vibration during transportation or vibration caused by the cooling fan 50 during operation. However, according to the present embodiment, the mechanical connection between the card edge type socket 39 and the card edge connector part 41 of each of the daughter boards 37-1 to 37-n is prevented from being loosened since the side 37a of each of the daughter boards 37-1 to 37-n is elastically pressed in the direction Y1. Accordingly, the system board device 30 according to the present embodiment has a higher reliability than the conventional system board device.

Each of the spring plate members 70 and 71 may be split into a plurality of strips so that each of the strips presses the corresponding one of the daughter boards 37-1 to 37-n. In such a case, each of the daughter boards 37-1 to 37-n can be pressed individually, and, thereby, each of the daughter boards 37-1 to 37-n can be positively pressed even if the height h of each of the daughter boards 37-1 to 37-n varies from board to board. Additionally, if a block made of a sponge-like material is used instead of the spring plate members 70 and 71, the same effects can be obtained.

Figure 5B:
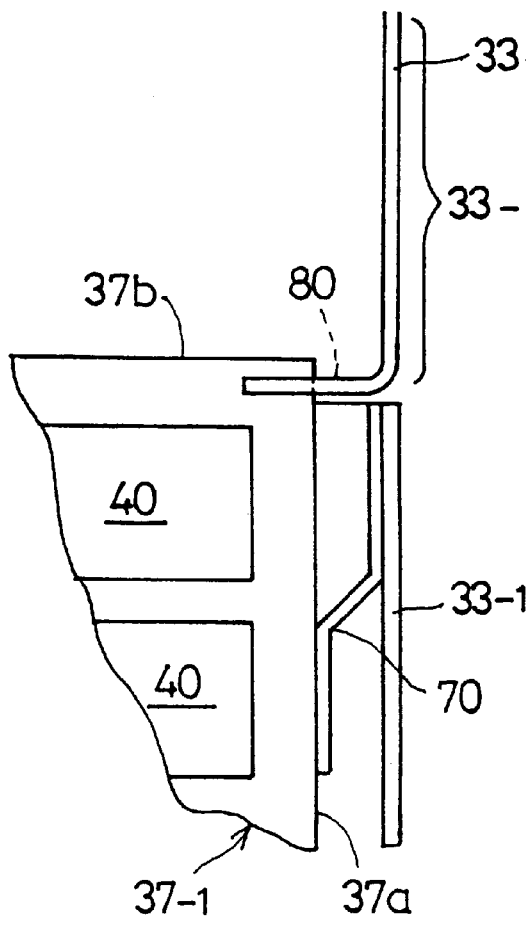
FIG. 5B is an enlarged view of the part encircled by a circle B in FIG. 3D.
Figure 5A:
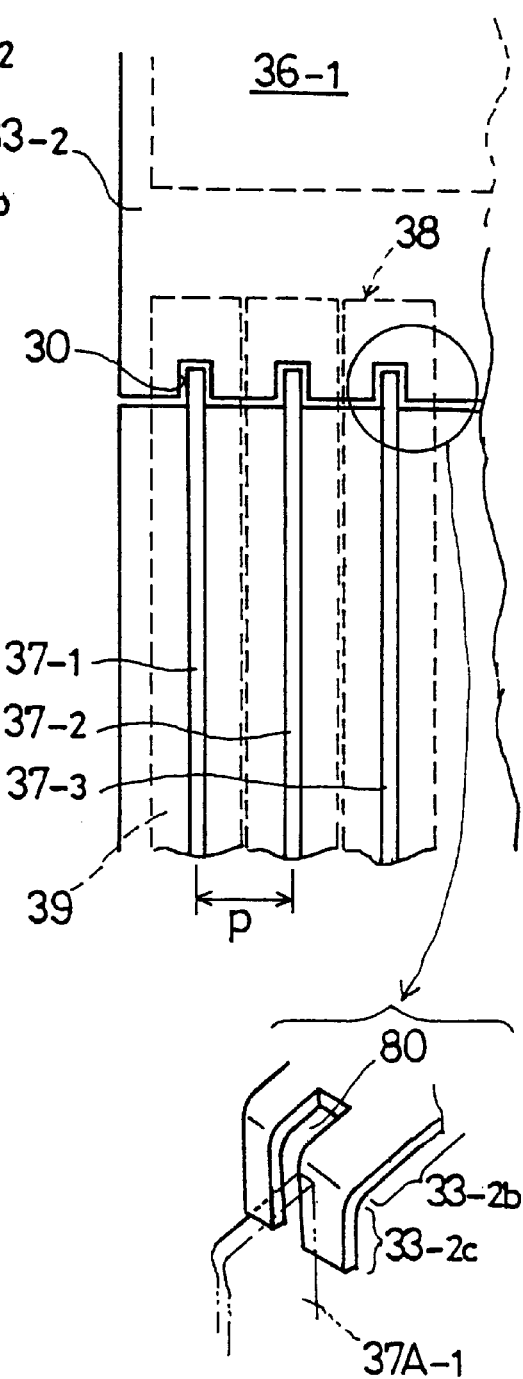
FIG. 5A is an enlarged view of a part encircled by a circle A in FIG. 3B.
Figure 6:
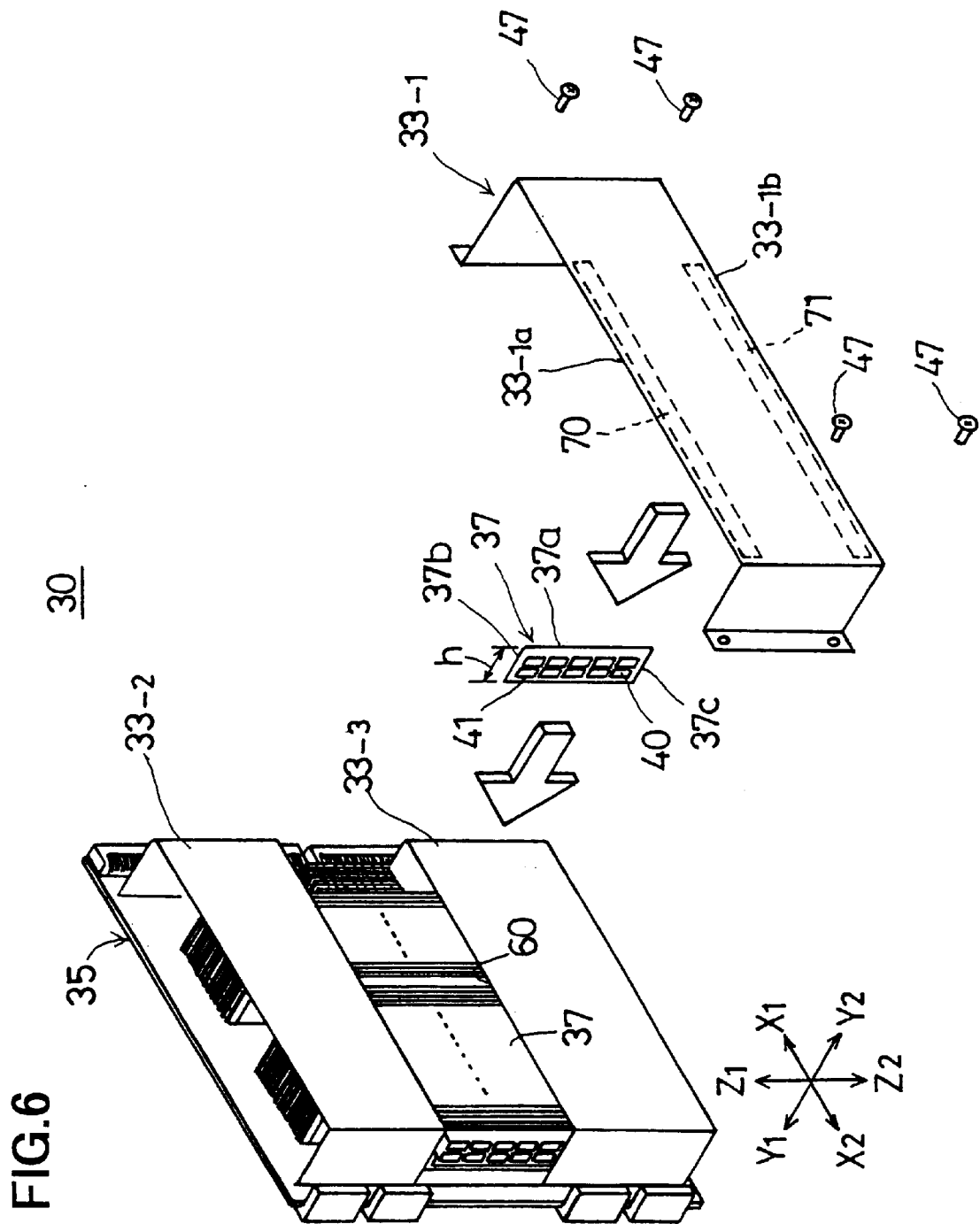
FIG. 6 is an illustration for explaining a maintenance operation to replace a daughter board shown in FIG. 3B.

(2) An arrangement for restricting an inclination of each of the daughter boards 37-1 to 37-n in the direction X1 or X2, and for facilitating an operation for connecting each of the daughter boards 37-1 to 37-n to the motherboard 35:

As shown in FIGS. 3A, 5A and 5B, a side 33-2a of the electronic-parts cover 33-2, which side defines the opening window 60, has a plurality of notches 80 each of which has a width slightly larger than a thickness of each of the daughter boards 37-1 to 37-n. A pitch of the notches 80 is equal to the pitch p of the daughter boards 37-1 to 37-n.

The side 33-2a of the electronic-parts cover 33-2 has a flange part 33-2c which is formed by bending a cover body 33-2b in the direction Y1. Each of the notches 80 extends from a part of the cover body 33-2b to the end of the flange part 33-2c.

Similarly, a side 33-3a of the electronic-parts cover 33-3, which side defines the opening window 60, has a plurality of notches 81 each of which has a width slightly larger than a thickness of each of the daughter boards 37-1 to 37-n.

When the electronic-parts covers 33-2 and 33-3 are attached to the motherboard 35, each of the daughter boards 37-1 to 37-n protrudes into the respective notches 80 and 81 as shown in FIGS. 5A and 5B. Thereby, each of the daughter boards 37-1 to 37-n is positively prevented from being inclined in the direction X1 or X2 even if the system board device 30 is subjected to shock or vibration during transportation or vibration caused by the cooling fan 50 during operation. Accordingly, the system board device 30 according to the present embodiment has a higher reliability than the conventional system board device.

It should be noted that each of the daughter boards 37-1 to 37-n, when it is mounted on the motherboard 35, is engaged with a part of the corresponding one of the notches 80 which part is positioned on the flange part 33-2c. Similarly, each of the daughter boards 37-1 to 37-n, when it is mounted on the motherboard 35, is engaged with a part of the corresponding one of the notches 81 which part is positioned on a flange part (not shown in the figures) of the electronic-parts cover 33-3 similar to the electronic-parts cover 33-2. Accordingly, each of the daughter boards 37-1 to 37-n does not protrude from the electronic-parts covers 33-2 and 33-3 in the direction Y2.

In the above-mentioned arrangement with respect to the notches 80 and 81, the daughter board 37 can be easily positioned for connection by inserting a side 37b of the daughter board 37 into the corresponding one of the notches 80 and inserting a side 37c of the daughter board 37 into the corresponding one of the notches 81. Additionally, in the process of inserting the daughter board 37, the side 37b and the side 37c are guided by the respective notches 80 and 81. Accordingly, the card edge connector part 41 of the daughter board 37 is moved toward the card edge type socket 39 of the motherboard 35 by merely inserting the daughter board 37 into the corresponding notches 80 and 81. Thus, the operation for connecting the daughter board 37 to the motherboard 35 is smooth and easy. This results in reduction in a time spent on a maintenance operation.

It should be noted that, in the system board device 30 of the present embodiment, although the daughter boards 37-1 to 37-n are mounted in the middle of the motherboard 35 in the direction Z1 or Z2 and the daughter-board cover 33-1 is positioned in the middle of the motherboard 35 in the direction Z1 or Z2, the present invention is not limited to such an arrangement. That is, if the daughter boards 37-1 to 37-n are mounted on the upper part 35a of the motherboard 35, the daughter-board cover 33-1 is attached to the upper part 35a. If the daughter boards 37-1 to 37-n are mounted on the lower part 35c of the motherboard 35, the daughter-board cover 33-1 is attached to the lower part 35c.

Figure 7:
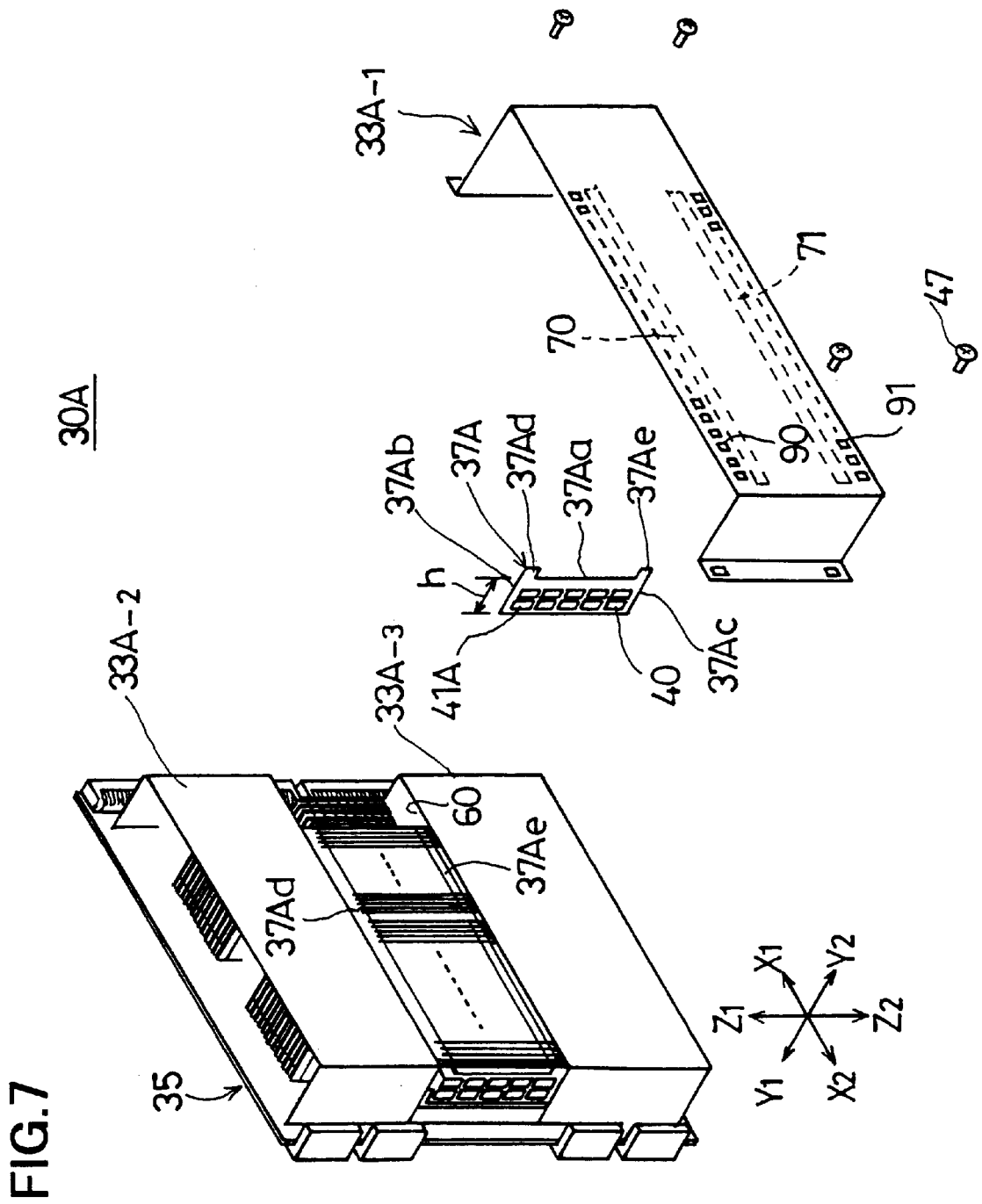
FIG. 7 is a perspective view of a system board device according to a second embodiment of the present invention.

A description will now be given of a second embodiment of the present invention. FIG. 7 is an exploded perspective view of a system board device 30A according to the second embodiment of the present invention. FIGS. 8A and 8B are enlarged views of parts of the system board device 30A shown in FIG. 7. It should be noted that FIGS. 8A and 8B correspond to FIGS. 5A and 5B. In FIGS. 7, 8A and 8B, parts that are the same as the parts shown in FIGS. 2, 5A and 5B are given the same reference numerals, and descriptions thereof will be omitted. Additionally, in FIGS. 7, 8A and 8B, parts corresponding to the parts shown in FIGS. 5A and 5B are given the same reference numerals with a suffix A.

Each of the daughter boards 37A has a pair of protrusions 37Ad and 37Ae protruding from the side 37Aa in the direction Y2. The protrusion 37Ad is located near the side 37Ab, and the protrusion 37Ae is located near the side 37Ac. The daughter-board cover 33A-1 has a plurality of openings 90 which receive the respective protrusions 37Ad. Additionally, the daughter-board cover 33A-1 has a plurality of openings 91 which receive the respective protrusions 37Ae.

In a state in which the daughter-board cover 33A-1 is mounted, the protrusions 37Ad are fit in the respective openings 90, and the protrusions 37Ae are fit in the respective openings 91. Thus, each of the daughter boards 37A is positively prevented from being inclined in the direction X1 or X2. Accordingly, the system board device 30A according to the present embodiment has a higher reliability than the conventional system board device. It should be noted that the openings 90 and 91 may be replaced by notches.

Additionally, the spring plate members 70 and 71 press the side 37Aa of the daughter board 37A in the direction Y1. Thereby, the mechanical connection between the card edge type socket 39 and the card edge connector part 41A of each of the daughter boards 37A is prevented from being loosened since the side 37Aa of each of the daughter boards 37A is elastically pressed in the direction Y1. Accordingly, the system board device 30A according to the present embodiment has a higher reliability than the conventional system board device.

The present invention is not limited to the specifically disclosed embodiments, and variations and modifications may be made without departing from the scope of the present invention.

The present application is based on Japanese priority application No.10-209783 filed on Jul. 24, 1998, the entire contents of which are hereby incorporated by reference.

What is claimed is:

1. A system board device adapted to be subjected to forced-air cooling, the system board device comprising:

a motherboard on which at least one electronic part generating heat is mounted;

a plurality of daughter boards removably mounted on said motherboard, the daughter boards being mounted so as to be perpendicular to said motherboard; and a ventilation cover attached to said motherboard so as to form an air passage therebetween so that the electronic part and the daughter boards are accommodated in said air passage, said ventilation cover including a daughter-board cover covering the daughter boards, said daughter-board cover being displaceable so that each of the daughter boards are accessible.

2. The system board device as claimed in claim 1, wherein said daughter-board cover includes an elastic member which elastically presses each of said daughter boards toward said motherboard in a state in which said daughter-board cover is attached to said motherboard so as to cover said daughter boards.

3. The system board device as claimed in claim 1, wherein each of said daughter boards has at least one protrusion protruding toward said daughter-board cover in a state in which said daughter-board cover is attached to said motherboard so as to cover said daughter boards, and said daughter-board cover includes engaging portions each of which is engaged with the protrusion of a corresponding one of said daughter boards in the state in which said daughter-board cover is attached to said motherboard so as to cover said daughter boards.

4. The system board device as claimed in claim 3, wherein said engaging portions are openings formed in said daughter-board cover so that the protrusion of each of said daughter boards protrudes into a corresponding one of the openings.

5. The system board device as claimed in claim 1, wherein said ventilation cover includes a parts cover adjacent to said daughter-board cover, said parts cover having a flange portion extending toward said motherboard, said flange portion being formed on a side of said parts cover which side faces said daughter-board cover, said flange portion including notches so that each of the notches engages with a side of one of said daughter boards when the one of said daughter boards is being moved toward said motherboard for connection, each of the notches engaging with the one of said daughter boards in a state in which the one of said daughter boards is mounted on said motherboard.

6. An apparatus comprising:

a cooling fan generating an air flow; and a system board device adapted to be subjected to forced-air cooling by the air flow generated by said cooling fan, the system board device comprising:

a motherboard on which at least one electronic part generating heat is mounted;

a plurality of daughter boards removably mounted on said motherboard, the daughter boards being mounted so as to be perpendicular to said motherboard; and a ventilation cover attached to said motherboard so as to form an air passage therebetween so that the electronic part and the daughter boards are accommodated in said air passage, said ventilation cover including a daughter-board cover covering the daughter boards, said daughter-board cover being displaceable so that each of the daughter boards are accessible.

* * * * *